July 28, 1931.  H. A. FALES  1,816,043
CAUSTIC ALKALI STICK
Filed Nov. 30, 1928
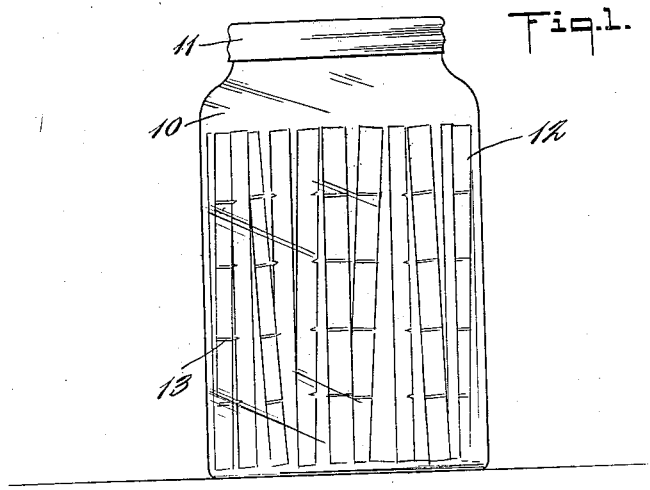
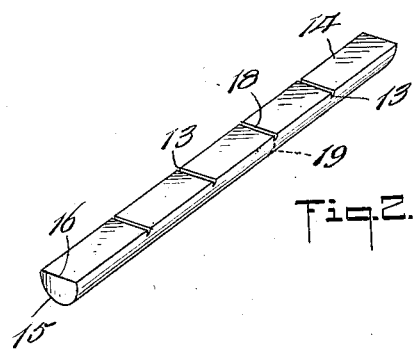
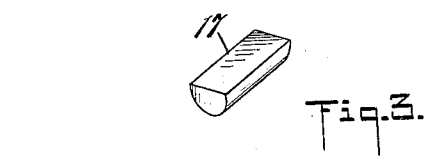
INVENTOR
HAROLD A. FALES
BY
ATTORNEY Patented July 28, 1931

1,816,043

UNITED STATES PATENT OFFICE

HAROLD A. FALES, OF LEONIA, NEW JERSEY, ASSIGNOR TO THE FALES CHEMICAL COMPANY, INC., OF CORNWALL LANDING, NEW YORK, A CORPORATION OF NEW YORK

CAUSTIC ALKALI STICK

Application filed November 30, 1928. Serial No. 322,951.

The invention relates in general to a method of weighing out accurately a pre-selected amount of a chemical substance characterized by the fact that its weight varies automatically when exposed to atmospheric air, without necessity of actually weighing the requisite mass of material and without necessity of providing for a correction in the material, and the invention relates to a form of article made of this substance and used in practicing the method hereinafter featured.

The primary object of the invention is to provide the substance in such form and to handle the substance in such way that requisite weights of the substance can be obtained by visually selecting a unit length, or a multiple of a unit length of the substance, and severing the selected length to obtain the requisite weight.

More specifically defined the invention relates to a method of preparing sticks of caustic soda and caustic potash, hereinafter collectively referred to as caustic alkalies, with scored lines or weakened portions arranged so that when the stick is severed along these lines unit lengths of the caustic alkalies may be obtained, which unit length will have a prescribed definite weight when considered in its condition unaffected by exposure to the air.

It is understood such caustic alkalies when exposed to atmospheric air for any length of time absorb carbon-dioxide from the air which forms an impurity coating of sodium carbonate amounting not infrequently to 5% by weight of the caustic alkali. In accordance with the present practice it is necessary in using caustic alkali where definite amounts are employed, such, for instance, as in making normal or fractions of normal solutions, to estimate, or more nearly to guess the amount of impurities present and to figure accordingly as to how much of the air exposed alkali is to be used to make any definite strength of solution. The longer it takes the operator to weigh out the caustic the greater becomes the percentage of error in the weighing of the portion, and, especially in the cases of substances like caustic soda in stick form, the flying particles being highly corrosive are dangerous to the operator and apt to be deleterious to any surface or material on which they may alight.

Accordingly an object of the invention is to provide the alkali sticks in such form that they may be readily separated into units of accurately pre-fixed weights, and to retain the sticks in suitably hermetically closed receptacles until ready for use.

Referring to the caustic stick as an article of manufacture, an object of the invention is to provide a form of stick which can be readily severed into units of equal and definitely fixed weights easily and with the minimum possibility of forming flying corrosive particles.

This phase of the invention is attained by forming the sticks of uniform cross section, with a flat side and preferably semi-circular or in the form of part of a conic section in cross section. This provides a form of stick having a flat side which can be scored transversely with longitudinally spaced apart weakened portions, and which weakened portions will be located in the portion of the stick which has the greatest structural strength. By scoring the stick at this place the severing of the stick along any selected score lines will result in a substantially clean cleavage of the stick at the selected point free from, or substantially free of the formation of chips, with the result that every severed portion will be sensibly of the same weight as every other severed portion of equal length.

Various other objects and advantages of the invention will be obvious from an inspection of the accompanying drawings and in part will be more fully set forth in the following particular description of one form of the article of manufacture constituting an embodiment of the invention.

In the accompanying drawings:

Fig. 1 is a view in side elevation of a receptacle containing sticks of prepared caustic alkalies constituting a preferred embodiment of the invention and illustrating an apparatus adapted for use in practicing the method featured in this disclosure.

Fig. 2 is a perspective view of one of the sticks shown in Fig. 1, and

Fig. 3 is a unit weight of the caustic stick from the caustic stick shown in Fig. 2.

In the drawings, and referring first to Fig. 1, there is disclosed a jar 10 provided with a closure 11 of the type commonly used in storing caustic alkalies, and in which receptacle is contained a plurality of preformed sticks 12 of a caustic alkali.

It is understood that the sticks 12 are retained in the receptacle 10 out of contact with exterior atmospheric air until it is desired to use some of the caustic alkali, at which time the receptacle is opened and a stick quickly withdrawn, after which the closure 11 is replaced so as to prevent, or at least minimize, the time during which the store of alkalies in the receptacle is exposed to the air.

Referring to the showing in Fig. 2, it will be seen that the stick has been moulded so as to have uniform cross sectional area from end to end except where the score lines 13 are disposed.

The stick is provided with a flat side 14 and when viewed in transverse cross section is outlined by a curved line 15 and a straight line 16, the latter disposed in and defining the plane of the flat side 14. In order to facilitate removal of the sticks from the moulds in which they are cast and for other reasons, it is preferable to form the sticks substantially semi-circular in cross section, as illustrated in Fig. 2, or semi-elliptical, and which curved sided form are referred to collectively hereinafter as being parts of a conic section.

The score lines 13 are accurately spaced apart in the flat surface 14 so that when a portion is severed or broken off to form the unit 17, shown in Fig. 3, this unit will have a definite weight. In one instance where the substance was chemically pure caustic soda having a molecular weight of 40 the unit weighed 2 grams, and in the example shown in Fig. 2 the stick weighed 10 grams. Positioning the score lines in the flat surface 14, provides weakening portions at the place of greatest structural strength of the stick along the diametrical line 16.

In operation and assuming that it was desired for instance to form a liter of fifth normal volumetric solution of the caustic soda, and that this solution required, say, 8 grams of the pure soda, the operator would open the receptacle 10, withdraw one of the sticks 12, and break off an end portion of the stick along the line 18, and which act would form a line of cleavage 19 through the stick 12. The smaller portion containing the one unit should then be replaced in the receptacle 10, the cover replaced, and the severed portion containing the four two-gram units placed immediately in the solvent. It is obvious that this can be done quickly and that there is such a small time interval between the instant the stick is withdrawn from the receptacle until it is deposited in the solvent that the selected portion has not had an opportunity to have its weight varied to any perceptible extent. As a result solutions of uniform strength can be obtained whenever desired and with the assurance that the amount of pure caustic alkali used in each instance will be sensibly the same, each time the same number of unit lengths have been severed from the stock sticks.

It is obviously within the scope of the disclosure to mould the sticks into sizes which can be handled conveniently and due regard is taken of the purpose for which they are to be used. Where extremely small weights of the material are desired for instance, it is apparent that the sticks may be formed of relatively small cross sectional area and the proper spacing of the score or weakening lines will provide for any practical accuracy in the weight of the severed parts.

Claim:

A flat sided elongated stick of a caustic alkali of uniform cross sectional area throughout its length, said stick being substantially semicircular in cross section, said flat side provided with longitudinally spaced apart grooves forming score lines thereby providing weakened lines at the portion of greatest structural strength of the stick to facilitate a rapid and clean separating of the stick into separate units of substantially equal weight.

Signed at New York, in the county of New York, and State of New York, this 31st day of October, A. D. 1928.

HAROLD A. FALES.